(12) United States Patent
Kimura

(10) Patent No.: US 9,906,179 B1
(45) Date of Patent: Feb. 27, 2018

(54) MOTOR DRIVE CONTROL DEVICE AND MOTOR DRIVE CONTROL METHOD

(71) Applicant: Kabushiki Kaisha Toshiba, Minato-ku, Tokyo (JP)

(72) Inventor: Hideki Kimura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/261,195

(22) Filed: Sep. 9, 2016

Related U.S. Application Data

(60) Provisional application No. 62/306,350, filed on Mar. 10, 2016.

(51) Int. Cl.
| | | |
|---|---|---|
| *G05B 5/00* | (2006.01) | |
| *H01H 7/08* | (2006.01) | |
| *H02P 1/04* | (2006.01) | |
| *H02P 3/00* | (2006.01) | |
| *H02P 21/22* | (2016.01) | |
| *H02P 27/08* | (2006.01) | |
| *H02P 8/00* | (2006.01) | |

(52) U.S. Cl.
CPC ............... *H02P 21/22* (2016.02); *H02P 8/00* (2013.01); *H02P 27/08* (2013.01)

(58) Field of Classification Search
CPC .................................. H02P 21/22; H02P 8/00
USPC ........................................................ 318/474
See application file for complete search history.

(56) References Cited

U.S. PATENT DOCUMENTS

| | | | | |
|---|---|---|---|---|
| 2008/0219649 A1* | 9/2008 | Hirata | ..................... | H02P 6/182 388/811 |
| 2009/0251062 A1* | 10/2009 | Hagino | ................ | G09G 3/3406 315/276 |
| 2010/0320946 A1* | 12/2010 | Ueda | ......................... | H02P 6/20 318/400.3 |
| 2011/0031917 A1* | 2/2011 | Shimizu | .................... | H02P 6/14 318/400.27 |
| 2013/0147278 A1* | 6/2013 | Arisawa | .................... | H02P 8/12 307/75 |

FOREIGN PATENT DOCUMENTS

| | | |
|---|---|---|
| JP | 63174592 A | 7/1988 |
| JP | 05137396 A | 6/1993 |
| JP | 2000-125593 A | 4/2000 |

* cited by examiner

*Primary Examiner* — Erick Glass
(74) *Attorney, Agent, or Firm* — White & Case LLP

(57) ABSTRACT

According to one embodiment, a motor drive control device includes a PWM control circuit that generates PWM signals corresponding to a predetermined exciting current pattern, an H bridge circuit that is constituted of switch transistors whose on/off is controlled by the PWM signals, a coil to which an exciting current is supplied from the H bridge circuit, and a current detection circuit that detects a current flowing into the coil. A value of a parameter of the exciting current pattern is corrected by using the detection result of the current detection circuit.

17 Claims, 12 Drawing Sheets

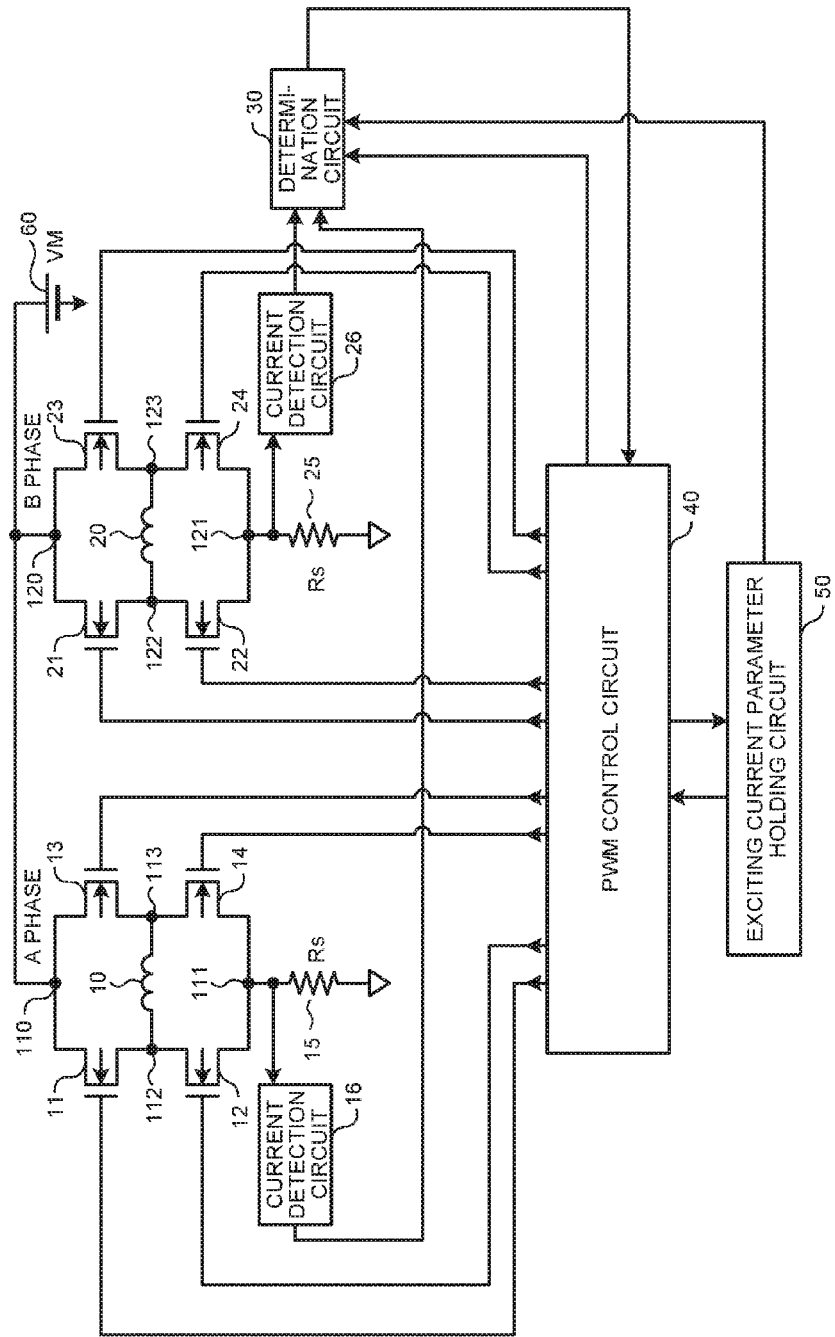

US 9,906,179 B1

MOTOR DRIVE CONTROL DEVICE AND MOTOR DRIVE CONTROL METHOD

CROSS-REFERENCE TO RELATED APPLICATIONS

This application is based upon and claims the benefit of priority from U.S. Provisional Application No. 62/306,350, filed on Mar. 10, 2016; the entire contents of which are incorporated herein by reference.

FIELD

Embodiments described herein relate generally to a motor drive control device and a motor drive control method.

BACKGROUND

Conventionally, there is performed motor drive control by which exciting currents based on a pseudo-sine-waveform exciting current pattern are supplied to coils to generate a magnetic field and a rotor is rotated by the generated magnetic field. It is considered that the pseudo-sine-waveform exciting current pattern generates an ideal rotating magnetic field. However, actually, in the case where motors have different characteristics and excitation is performed based on a pseudo-sine-waveform exciting current pattern, good-efficiency motor drive is not necessarily performed. For example, the excess and deficiency of an exciting current cause the excess and deficiency of rotary torque, and thus vibrations and noises are generated during the rotation of the rotor. For this reason, there is desired a motor drive control device and a motor drive control method that allow the control according to the characteristics of respective motors.

BRIEF DESCRIPTION OF THE DRAWINGS

FIG. 1 is a diagram illustrating the configuration of a motor drive control device according to a first embodiment;

DETAILED DESCRIPTION

Figure 2A:
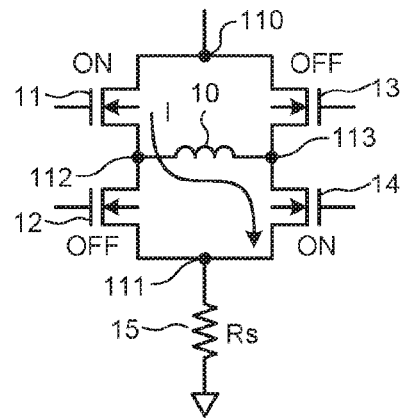
FIGS. 2A to 2C are diagrams explaining a relationship of a current flowing into a coil and a current detection method.

In general, according to one embodiment, a motor drive control device includes: a PWM control circuit that generates a PWM signal corresponding to a predetermined exciting current pattern; an H bridge circuit that is constituted of switch transistors whose on/off is controlled by the PWM signal; a coil to which an exciting current is supplied by the on/off of the switch transistors of the H bridge circuit; a resistor that is connected to the H bridge circuit and to which a current flowing through the coil is supplied; a current detection circuit that detects a current flowing into the resistor; and a determination circuit that compares a detection result of the current detection circuit with a value of a parameter of the predetermined exciting current pattern and outputs a signal for correcting the value of the parameter of the predetermined exciting current pattern in accordance with a comparison result.

Exemplary embodiments of a motor drive control device and a motor drive control method will be explained below in detail with reference to the accompanying drawings. The present invention is not limited to the following embodiments.

First Embodiment

FIG. 1 is a diagram illustrating the configuration of a motor drive control device according to the first embodiment. The motor drive control device according to the present embodiment includes four NMOS transistors (11 to 14) that constitute a first-phase (A-phase) H bridge circuit. The drains of the NMOS transistor 11 and the NMOS transistor 13 are connected to each other at a connection point 110. A voltage source 60 that supplies a voltage VM is connected to the connection point 110.

The sources of the NMOS transistor 12 and the NMOS transistor 14 are connected to a connection point 111. A resistor 15 for current detection is connected between the connection point 111 and ground. The resistor 15 has a resistance value Rs. The source of the NMOS transistor 11 and the drain of the NMOS transistor 12 are connected to each other at a connection point 112. The source of the NMOS transistor 13 and the drain of the NMOS transistor 14 are connected to a connection point 113. A coil 10 is connected to the connection point 112 and the connection point 113.

A current detection circuit 16 is connected to the resistor 15. The current detection circuit 16 detects a current flowing into the resistor 15. The output of the current detection circuit 16 is supplied to a determination circuit 30.

The motor drive control device further includes four NMOS switch transistors (21 to 24) that constitute a second-phase (B-phase) H bridge circuit. The drains of the NMOS transistor 21 and the NMOS transistor 23 are connected to each other at a connection point 120. The voltage source 60 that supplies the voltage VM is connected to the connection point 120.

The sources of the NMOS transistor 22 and the NMOS transistor 24 are connected to a connection point 121. A resistor 25 for current detection is connected between the connection point 121 and ground. The resistor 25 has a resistance value Rs. The source of the NMOS transistor 21 and the drain of the NMOS transistor 22 are connected to each other at a connection point 122. The source of the NMOS transistor 23 and the drain of the NMOS transistor 24 are connected to a connection point 123. A coil 20 is connected to the connection point 122 and the connection point 123.

A current detection circuit 26 is connected to the resistor 25. The current detection circuit 26 detects a current flowing into the resistor 25. The output of the current detection circuit 26 is supplied to the determination circuit 30.

PWM signals from a PWM control circuit 40 are supplied to the gates of the NMOS transistors (11 to 14) and the NMOS transistors (21 to 24) that constitute the respective bridge circuits. The on/off of the NMOS transistors (11 to 14) and the NMOS transistors (21 to 24) that constitute the respective H bridge circuits is controlled by the PWM signals that is supplied from the PWM control circuit 40. Exciting currents flowing into the coils (10, 20) are controlled by the on/off of the NMOS transistors. For example, the PWM signals whose duty ratio is controlled in accordance with a pseudo-sine-waveform exciting current pattern are supplied to the NMOS transistors (11 to 14) and the NMOS transistors (21 to 24).

An exciting current parameter holding circuit 50 holds values of parameters for generating various exciting current patterns. For example, the exciting current parameter holding circuit 50 holds a value of a parameter for generating a pseudo-sine-waveform exciting current pattern. The exciting current parameter holding circuit 50 can be configured of, for example, a rewritable flash memory. Moreover, the held parameter value specifies the duty ratio of PWM signals that are generated from the PWM control circuit 40, for example.

The value of the parameter of the exciting current parameter holding circuit 50 is supplied to the determination circuit 30. The determination circuit 32 compares the detection results of the current detection circuits (16, 26) with the value of the parameter from the exciting current parameter holding circuit 50. After comparing the detection results of the current detection circuits (16, 26) with the value of the parameter from the exciting current parameter holding circuit 50, the determination circuit 30 supplies to the PWM control circuit 40 an output signal for modifying PWM signals that are generated from the PWM control circuit 40 when the change of the exciting current pattern is needed. For example, the determination circuit 30 supplies an output signal for lengthening or shortening the duty ratio of PWM signals to the PWM control circuit 40.

The PWM control circuit 40 modifies the duty ratio of the PWM signals in response to the output signal of the determination circuit 30. For example, the PWM control circuit 40 sets the modified duty ratio of the PWM signals as a value of a parameter of a new exciting current pattern, and supplies the information to the exciting current parameter holding circuit 50. The exciting current parameter holding circuit 50 holds the modified the parameter value as the parameter value of the new exciting current pattern.

According to the present embodiment, exciting currents flowing into the coils (10, 20) are detected by detecting currents flowing through the NMOS transistors (11 to 14, 21 to 24) that constitute the H bridge circuits. It is determined whether the correction of the exciting currents is needed by comparing the states of the detected currents with the value of the parameter of the originally set exciting current pattern. When the correction of the exciting currents is needed, the correction of the exciting currents is performed. For this reason, the correction of the exciting currents corresponding to the operating states of motors or the characteristics of the respective motors can be performed. In other words, the drive control of the motor can be performed in accordance with a new exciting current pattern corresponding to an actual operating state by appropriately modifying the originally set exciting current pattern. As a result, because the motor drive control device can generate a magnetic field in accordance with an exciting current pattern corresponding to the characteristics of the respective motors to rotate a rotor (not illustrated), vibrations and noises during the rotation of the rotor can be reduced. Moreover, the present embodiment may have a configuration that the resistors (15, 25) are connected between the respective H bridge circuits and the voltage source 60 to detect a voltage drop occurring in the resistors (15, 25) by using the current detection circuits (16, 26).

The motor drive control device can correct an exciting current pattern and hold the corrected parameter value as a value of a parameter of a new exciting current pattern in tabular form. The controllability of the motor can be improved by using the value of the parameter of the exciting current pattern in tabular form. Moreover, the versatility of motor drive control can be improved by increasing the number of the tabled exciting current patterns.

Figure 2B:
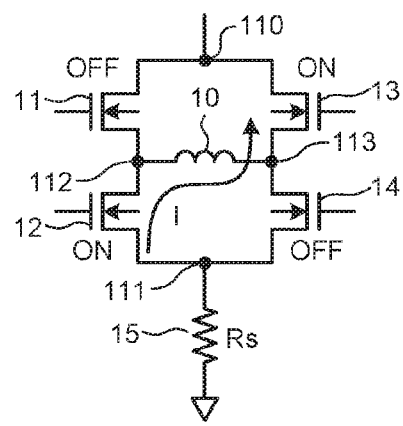
Figure 2C:
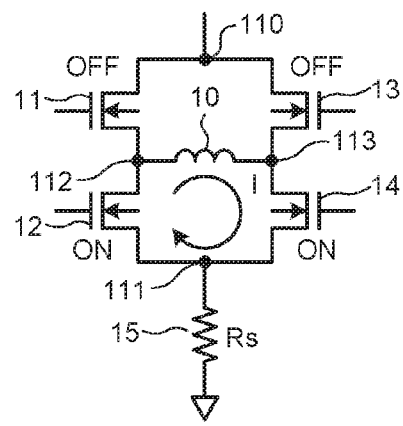

FIGS. 2A to 2C are diagrams explaining the operations of the NMOS transistors (11 to 14) that constitute the H bridge circuit controlled by the PWM signals from the PWN control circuit 40. FIG. 2A illustrates a case where the NMOS transistor 11 and the NMOS transistor 14 are in an ON state. In this state, a current flows into the coil 10 from the connection point 110. In other words, power is charged from the voltage source 60 to the coil 10. Hereinafter, this state is referred to as a charge state.

FIG. 2B illustrates a case where the NMOS transistor 12 and the NMOS transistor 13 are in an ON state. In this state, a current flows from the coil 10 toward the connection point 110. In this state, the power of the coil 10 is discharged. Hereinafter, this state is referred to as a discharge state.

FIG. 2C illustrates a case where the NMOS transistor 12 and the NMOS transistor 14 are in an ON state. In this case, the power of the coil 10 is slowly discharged via a loop formed by the NMOS transistor 12 and the NMOS transistor 14 that are in the ON state. Hereinafter, this state is referred to as a low-speed discharge state.

Figure 3:
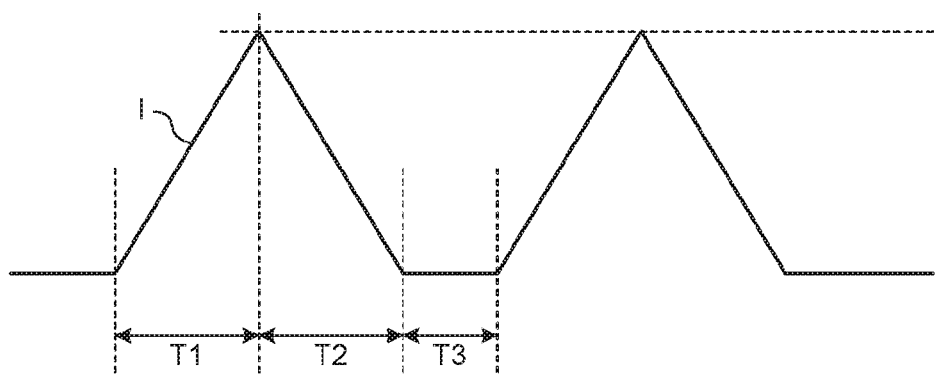
FIG. 3 is a diagram explaining a state of an exciting current during the drive of a motor.

FIG. 3 is a schematic diagram illustrating an exciting current I flowing through the coil 10 in the charge state, the discharge state, and. the low-speed discharge state described above. In a time interval T1 that indicates the charge state, the exciting current I increases. In a time interval T2 that indicates the discharge state, the exciting current I decreases. In a time interval T3 that indicates the low-speed discharge state, the exciting current I is substantially constant. Therefore, the exciting current I flowing into the coil 10 can be adjusted by modifying the duty ratio of the PWM signals from the PWM control circuit 40. In other words, it is possible to flow the exciting current I corresponding to the predetermined exciting current pattern into the coil 10 by controlling the duty ratio of the PWM signals.

Figure 4A:
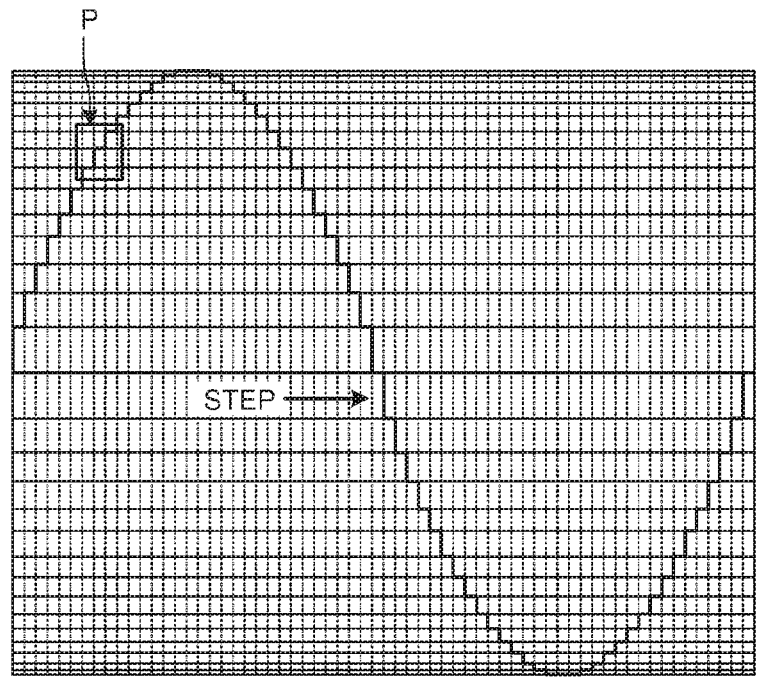
FIGS. 4A and 4B are diagrams explaining micro-step drive.
Figure 4B:
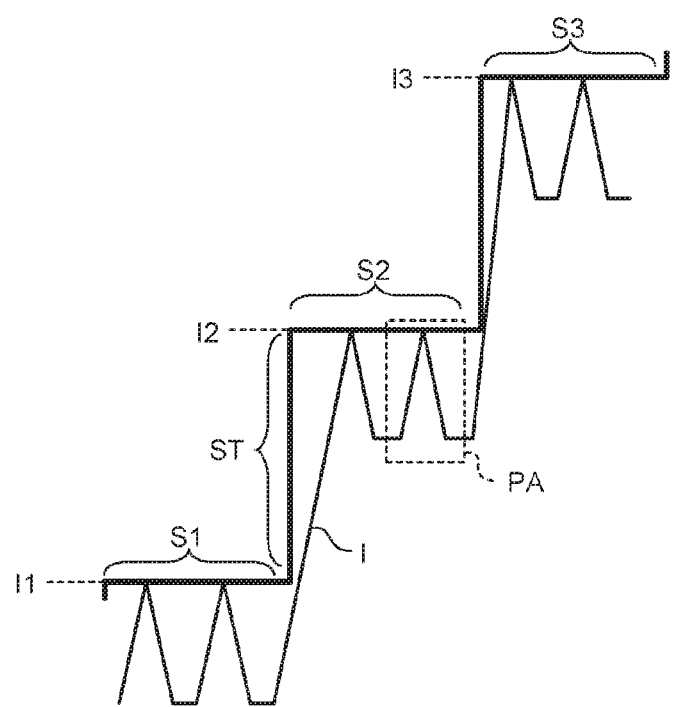

FIGS. 4A and 4B are diagrams explaining a pseudo-sine-waveform exciting current pattern. As illustrated in FIG. 4A, the pseudo-sine-waveform current pattern has a sine waveform divided into a plurality of areas (steps), and each step has an exciting current value of the size according to a sine wave. The steps are sequentially switched by the response of the PWM control circuit 40 to a clock signal (not illustrated) having a predetermined period, for example, and the value of the exciting current is changed by the switch of the steps. The magnetic fields generated by the coils (10, 20) are changed by changing the value of the exciting current, and a rotating magnetic field is generated. The rotor (not illustrated) is rotated in accordance with the magnetic field. In this way, for example, micro-step drive control for a stepping motor is performed.

FIG. 4B illustrates a diagram that is obtained by magnifying a part indicated by a symbol P in FIG. 4A. In Step S1, an exciting current is set to a current value I1. In Step S2, the exciting current is set to a current value I2. In Step S3, the exciting current is set to a current value I3. The duty ratio of the PWM signals to be supplied to the NMOS transistors (11 to 14, 21 to 24) of the H bridge circuits is set to become the set current values. The pseudo-sine-waveform current pattern is adjusted by changing a difference ST between the current values (I1 I2) respectively set in Step S1 and Step S2.

The detection of currents flowing through the resistors (15, 25) is performed, for example, at a timing PA corresponding to the second charge state in each of the steps (S1 to S3). The exciting current I at timings of charge/discharge/low-speed discharge after being shifted to each of the steps (S1 to S3) can be detected by detecting the second charge state. Moreover, the number of charges/discharges/low-speed discharges at each step can be appropriately changed and set by the PWM signals from the PWM control circuit 40.

Figure 5:
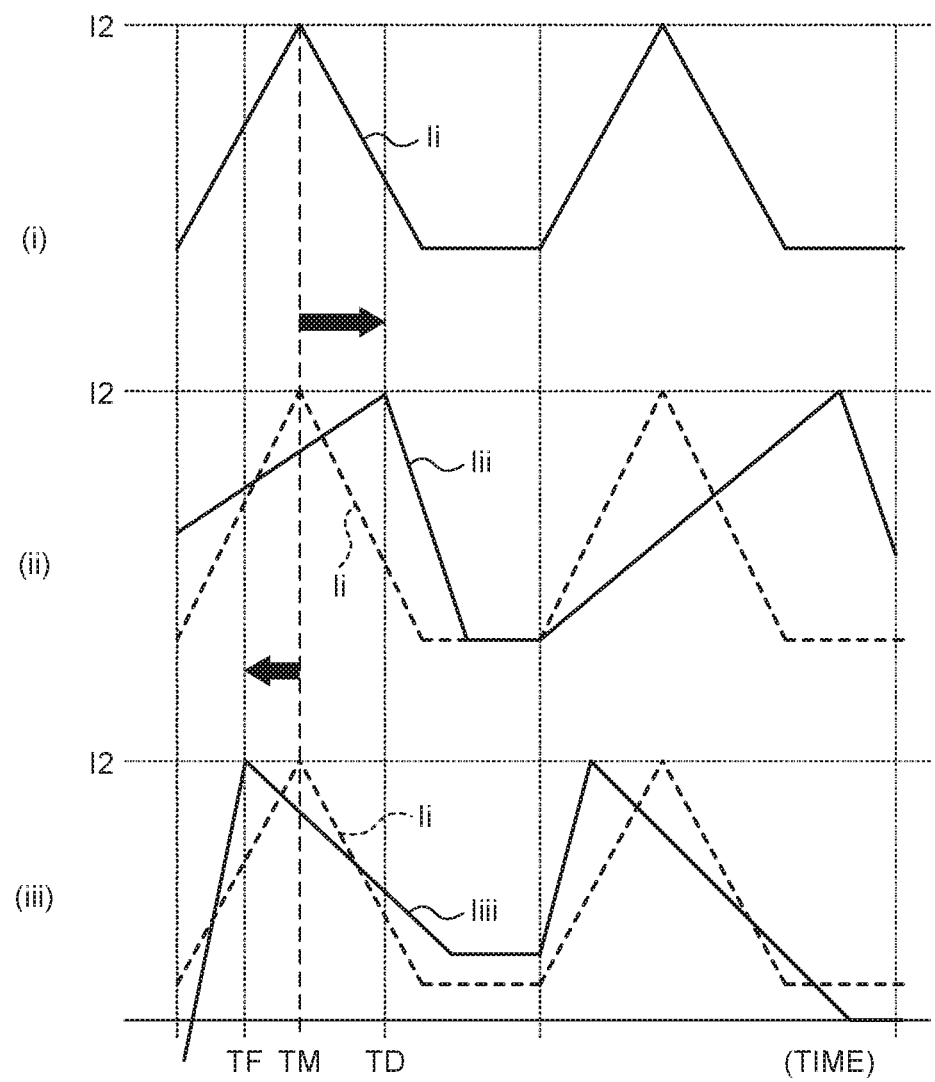
FIG. 5 is a diagram explaining the change in the state of the exciting current during the drive of the motor.

FIG. 5 is a diagram explaining a relationship between the detected coil current and the originally set exciting current. The upper portion (i) of the drawing illustrates an exciting current Ii in the case of a pseudo-sine-waveform exciting current pattern set as an initial-state exciting current pattern. The exciting current Ii arrives at the predetermined set current value I2 at a set time TM. The exciting current parameter holding circuit 50 holds information on the set time TM as a value of a parameter of the initial exciting current pattern. The value of the parameter of the set time TM may be, for example, a value of a product of a period of a reference clock signals (not illustrated) and the number of the reference clock signals.

When an exciting current is short, the rotary torque of the rotor is short. For this reason, because force against charge to the coils (10, 20) acts on, an exciting current Iii is in a state in which the current is hard to increase compared to the case of the originally set exciting current Ii as illustrated in the middle portion (ii). Therefore, a time arriving at the set current value I2 is delayed, and thus the exciting current arrives at the set current value I2 at a timing TD.

When an exciting current is excessive, the rotary torque of the rotor becomes large. In this case, the energy of the motor is saturated, and the exciting current is in a state in which the current is easy to increase. For this reason, an exciting current Iiii is in a state in which the current is easy to increase compared to the case of the set. exciting current Ii as illustrated in the lower portion (iii). Therefore, a time arriving at the set current value I2 is quickened, and thus the exciting current Iiii arrives at the set current value I2 at a timing TF.

Therefore, the current detection circuits (16, 26) can detect timings at which currents flowing through the resistors (15, 25) arrive at the set current value I2 and compare times up to the arrival timing, namely, charge times with the set time TM that is originally set so as to determine whether an exciting current is in a short state or not an excessive state. A value of a parameter of an exciting current pattern can be modified in accordance with the determined result. Moreover, the comparison between the set time TM and the time up to each of the timings (TD, TF) can be performed by, for example, a comparison between the number of reference clock signals held as the value of the parameter of the set time TM and the number of reference clock signals counted by a counter (not illustrated) provided in the determination circuit 30 up to each of the timings (TD, TF).

Figure 6A:
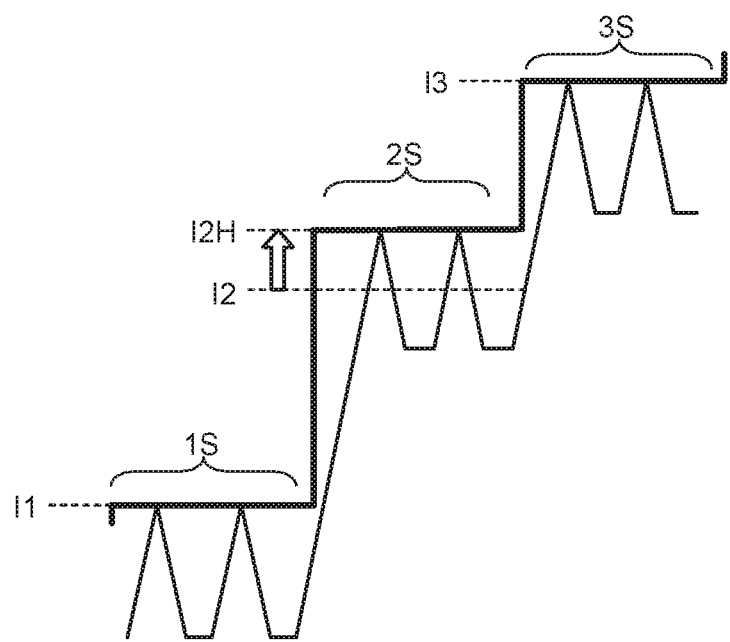
FIGS. 6A and 6B are diagrams explaining a modification method of a set value of an exciting current pattern.
Figure 6B:
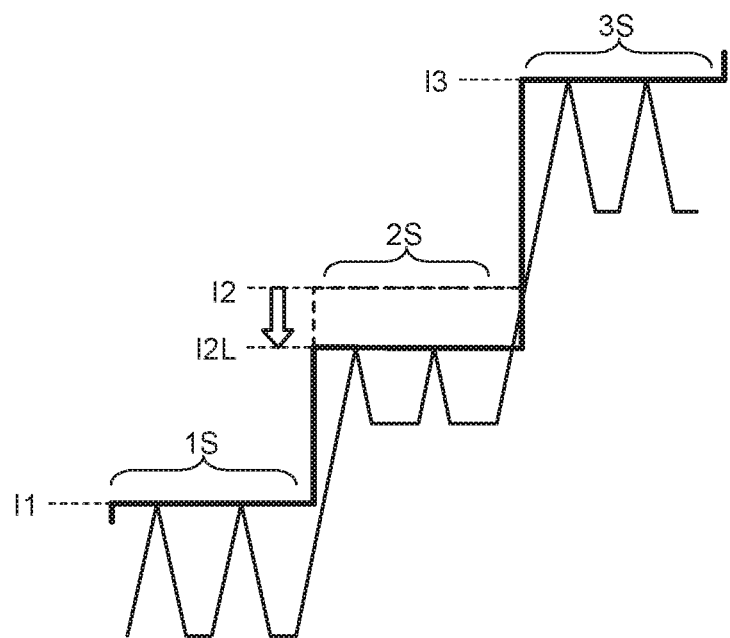

FIGS. 6A and 6B are diagrams explaining the correction of an exciting current pattern based on the detection result of an exciting current. FIG. 6A illustrates a case where the shortage of an exciting current is detected by detecting the exciting current. Control for modifying the exciting current pattern can be performed by changing the duty ratio of the PWM signals and raising the value of the exciting current from I2 to I2H.

FIG. 6B illustrates a correction in the case where the excess of an exciting current is detected by detecting the exciting current. For example, when the excess of an exciting current is detected in Step 2S, the control for decreasing a current setting value in Step 2S from I2 to I2L is performed. For example, the duty ratio of the PWM signals from the PWM control circuit 40 is changed to decrease the current setting value from I2 to I2L. The information on the value of the parameter used for the correction of the exciting current pattern is saved in the exciting current parameter holding circuit 50.

Figure 7:
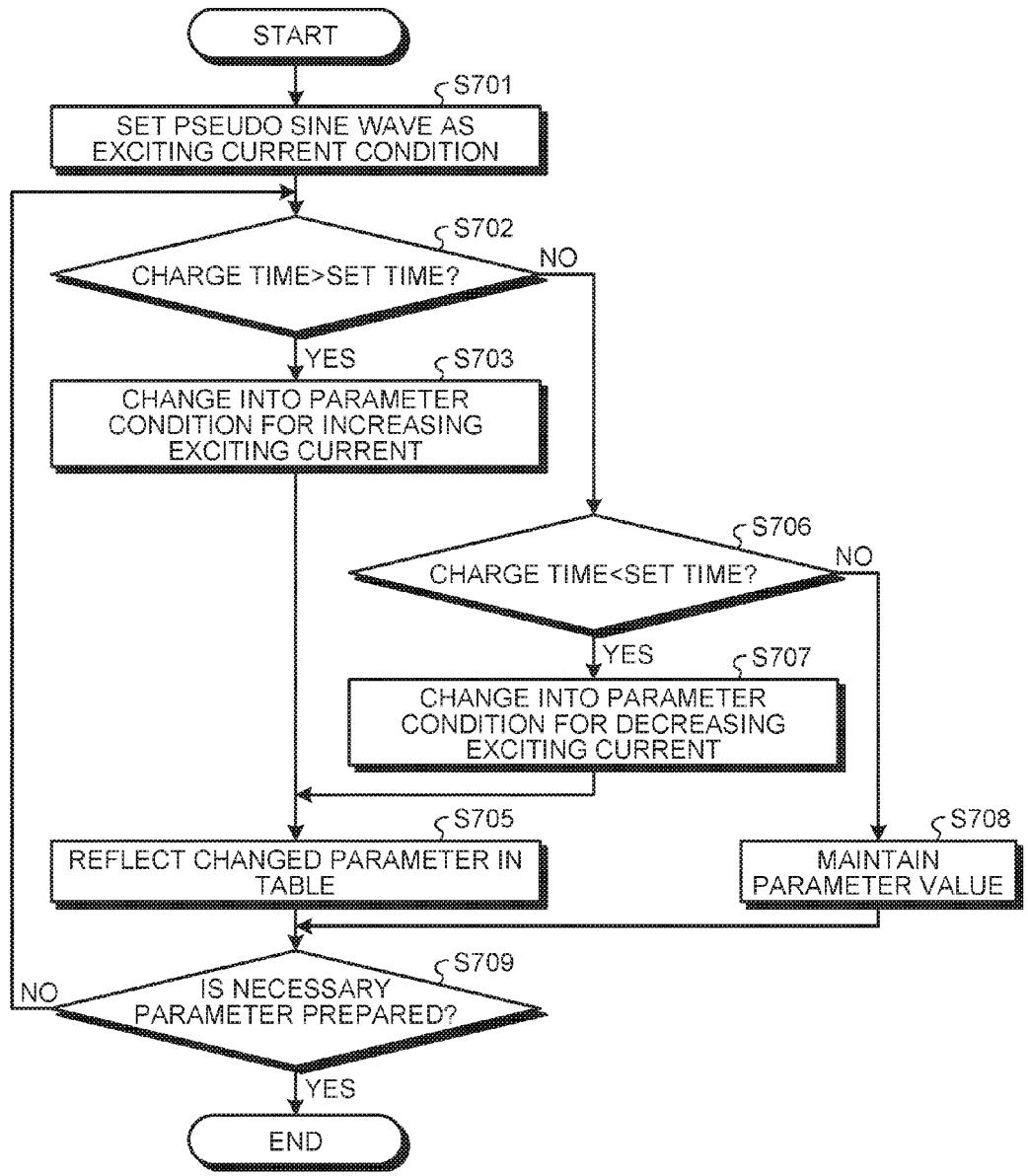
FIG. 7 is a diagram illustrating a flow of a motor drive control method that uses the embodiment illustrated in FIG. 1.

FIG. 7 illustrates one example of a flow of a motor drive control method. For example, the method is executed by using the embodiment illustrated in FIG. 1. For example, as an initial condition of an exciting current, an exciting current pattern having a pseudo sine wave is set (S701). For example, microstepping drive is performed in accordance with the pseudo-sine-waveform exciting current pattern.

An exciting current in each step is detected, and the comparison between the set time TM based on a set current and times up to the actually detected timings (TD, TF), namely, charge times is performed (S702) as described above. When the detected charge time is longer than the set time (S702: Yes), the change is performed to a parameter condition for increasing the exciting current (S703). The changed parameter value is supplied to the exciting current parameter holding circuit 50, and the parameter value is reflected in the value of an exciting current pattern table held in the exciting current parameter holding circuit 50 (S705).

When the detected charge time is no longer than the set time TM (S702: No), the determination of whether the charge time is shorter than the set time TM is performed (S706). When the charge time is shorter than the set time TM (S706: Yes), the change is performed to a parameter condition for reducing the exciting current (S707). The changed parameter value is supplied to the exciting current parameter holding circuit 50, and the parameter value is reflected in the value of the exciting current pattern table held in the exciting current parameter holding circuit 50 (S705).

When the charge time is not shorter than the set time TM (S706: No), the value of the parameter of the exciting current pattern is maintained (S708).

The comparison between the charge time and the set time TM can be performed while keeping a predetermined margin. In other words, the determination of whether the charge time is longer or not shorter than the value obtained by causing the set time TM to keep a margin can be performed, and the control for correcting the exciting current pattern can be performed on the basis of the result.

When the necessary parameter value is prepared by the detection of the exciting current (S709: Yes), the detection is terminated. When the necessary parameter value is not prepared (S709: No), the detection is continued. For example, the detection of the exciting current is performed on all steps of the pseudo-sine-waveform exciting current pattern, and the detection can be terminated when the comparison between the parameter value of the pseudo-sinewaveform exciting current pattern and the pattern of the detected exciting current is terminated. Alternatively, the detection may be terminated with only the detection in steps in the specific range. The detection in steps in the specific range will be described below.

Figure 8:
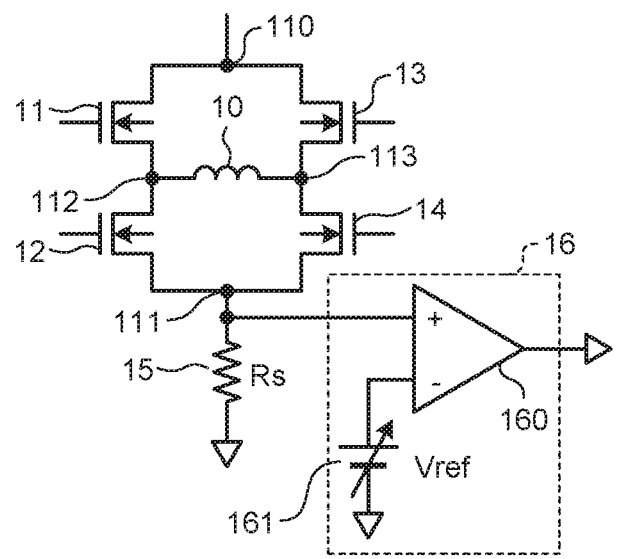
FIG. 8 is a diagram illustrating a configuration example of a current detection circuit.

FIG. 8 is a diagram illustrating one configuration example of the current detection circuit. In FIG. 8, an example in which the current detection circuit is provided in the first-phase (A-phase) H bridge circuit is illustrated. Constituent elements corresponding to the previously-described constituent elements have the same reference numbers. The current detection circuit 16 includes a comparator circuit 160 whose positive-side input port (+) is connected to the resistor 15. A voltage source 161 that supplies a reference voltage Vref is connected to a negative-side input port (−) of the comparator circuit 160. An output signal of the comparator circuit 160 is supplied to the determination circuit 30 of the embodiment illustrated in FIG. 1.

When a voltage applied to the positive-side input port (+) becomes higher than the reference voltage Vref, the comparator circuit 160 outputs a High-level output signal, for example. In other words, the fact that a voltage drop occurring in the resistor 15 due to the exciting current flowing through the coil 10 becomes higher than the reference voltage Vref can be detected by the comparator circuit 160. The charge time can be detected by detecting a time from the start of the charge to the coil 10 to the timing (TD, TM) at which the voltage drop in the resistor 15 exceeds the reference voltage Vref. For example, a timer (not illustrated) is provided in the determination circuit 30, and the timer can detect a time from a timing at which the charge starts in response to the rising of the PWM signal generated from the PWM control circuit 40 to a timing at which the voltage drop in the resistor 15 exceeds the reference voltage Vref so as to detect the charge time.

Figure 9:
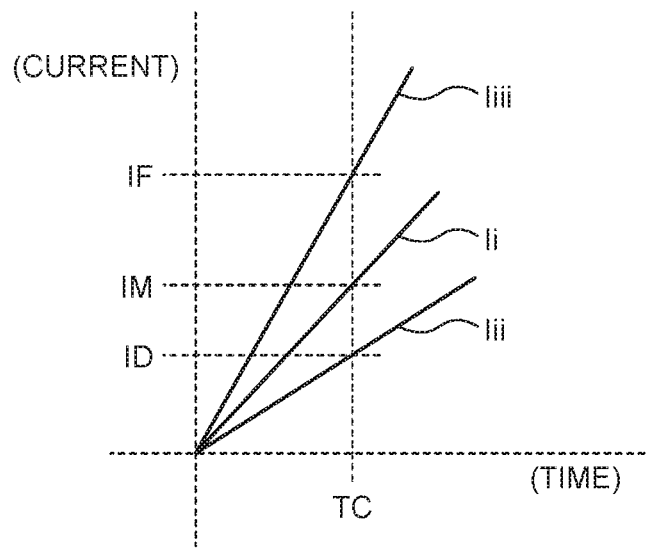
FIG. 9 is a diagram explaining another method of the current detection.

FIG. 9 is a diagram explaining another method of the current detection. In the method, the current detection circuit 16 detects an exciting current at a predetermined timing TC. In this method, instead of the comparison of the charge time until an exciting current exceeds the predetermined the set current value I2, the comparison of a value of an exciting current at the predetermined timing TC is performed and the correction of the parameter value is performed in accordance with the comparison result.

As described above, when the exciting current is short, the inclination of the exciting current becomes small as indicated by the symbol Iii in FIG. 9. For example, the value of the exciting current at the predetermined timing IC becomes ID.

On the other hand, when the exciting current is excessive, the inclination of the exciting current becomes large as indicated by the symbol Iiii In FIG. 9. The value of the exciting current at the predetermined timing IC becomes IF.

Therefore, by detecting an exciting current at the predetermined timing TC by using the current detection circuit 16 and comparing the detected exciting current with a set current value IM by the exciting current Ii of the originally set exciting current pattern, the determination of whether control for increasing the exciting current is required or not control for decreasing the exciting current is required can be performed. For example, this embodiment can have a configuration that the set current value IM corresponding to the exciting current pattern at the predetermined timing TC is held in the exciting current parameter holding circuit 50 as the parameter value, and the set current value 114 and the value (ID, IF) of the exciting current detected at the predetermined timing IC are compared. Moreover, by setting the value of the voltage corresponding to the set current value IM at the predetermined timing TC as the reference voltage Vref, the comparison with the value of the voltage drop occurring in the resistor 15 at the timing IC can be performed by using the configuration same as the configuration illustrated in FIG. 8. Moreover, the timing TC can be a time after a predetermined time passes from a timing at which the charge starts in response to the rising of the PWM signal generated from the PWM control circuit 40.

Figure 10A:
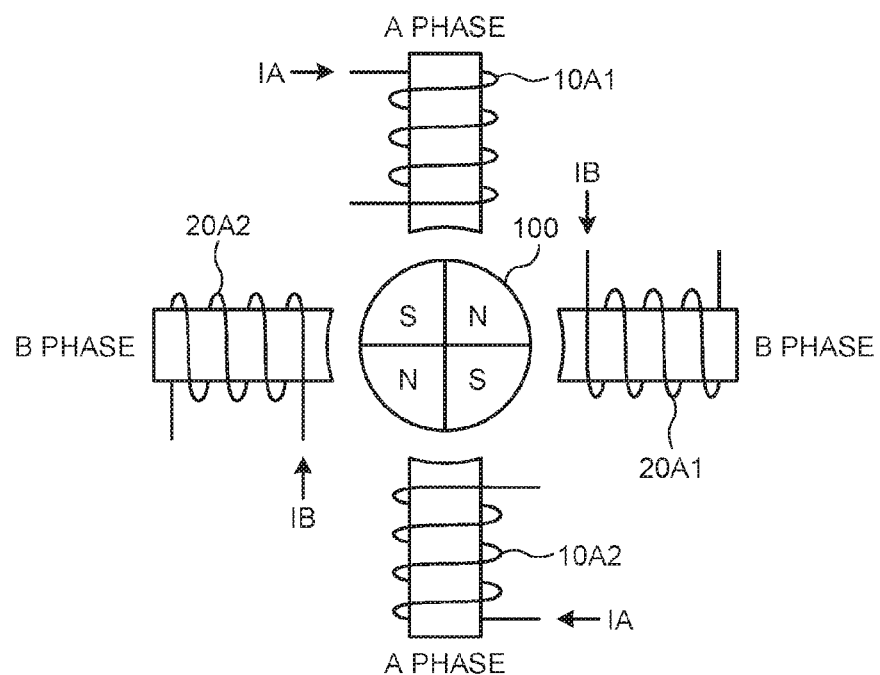
FIGS. 10A and 10B are diagrams explaining a relationship between the supply of an exciting current and the rotation of a rotor.
Figure 10B:
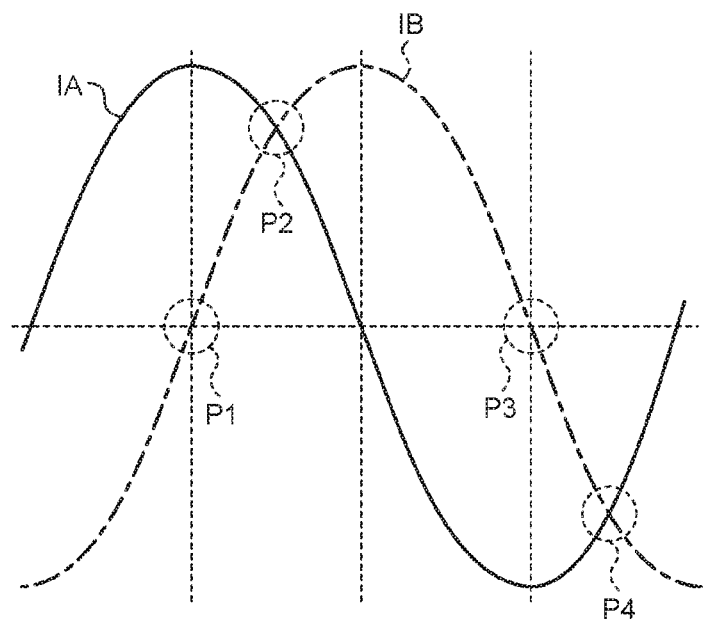

FIGS. 10A and 10B are schematic diagrams explaining a relationship between the supply state of an exciting current and the rotation of a rotor. In FIG. 10A, coils (10A1, 10A2) are equivalent to the A-phase coil 10 according to the embodiment illustrated in FIG. 1. Similarly, coils (20A1, 20A2) are equivalent to the B-phase coil 20. Exciting currents (IA, IB) are supplied to the A-phase coils (10A1, 10A2) and the B-phase coils (20A1, 20A2). The exciting currents (IA, IB) are supplied, for example, in accordance with a pseudo-sine-waveform exciting current pattern. The rotation of a rotor 100 is controlled by supplying the exciting currents (IA, IB) to the respective coils.

FIG. 10B illustrates the exciting current IA supplied to the A-phase coils (10A1, 10A2) and the exciting current IB supplied to the B-phase coils (20A1, 20A2). The coils (10A1, 10A2, 20A1, 20A2) generate magnetic fields due to a phase difference between the exciting currents supplied to the A-phase coils (10A1, 10A2) and the B-phase coils (20A1, 20A2) to control the rotational position of the rotor 100.

For example, the exciting current IA supplied to the A-phase coil 10 and the exciting current IB supplied to the B-phase coil 20 have the same value at a point P2. In this state, the A-phase and B-phase coils (10, 20) theoretically generate a magnetic field having the same intensity, and thus the north or south pole of the rotor 100 is rotated up to the position of an intermediate rotation angle in which the coils (10, 20) are arranged to become a stable state. This state is a state in which an electrical angle is 45 degrees in the case of the B-phase exciting current IB, for example. Therefore, for example, the determination of whether the rotor 100 is actually rotated in a stable state can be performed by detecting the exciting current at the timing in the step at which the phase of one of the exciting currents (IA, IB) becomes the electrical angle of 45 degrees. It is also similar in the case of a point P4.

in the case of a B-phase, the state at points P1 and P3 is a state in which the exciting current is not supplied to the coil 20. The points are in a high-impedance (hereinafter, called Hi-Z) state. Because the exciting current is not supplied originally, an induced voltage does not occur in the coil 20. However, when the exciting current is excessive, the induced voltage occurs in the coil 20 at the time of Hi-Z. For this reason, the determination of whether the correction of the exciting current is required can be performed by detecting the presence or absence of the induced voltage at the time of Hi-Z. The control by the detection of the induced voltage at the time of Hi-Z will be described below.

Second Embodiment

Figure 11:
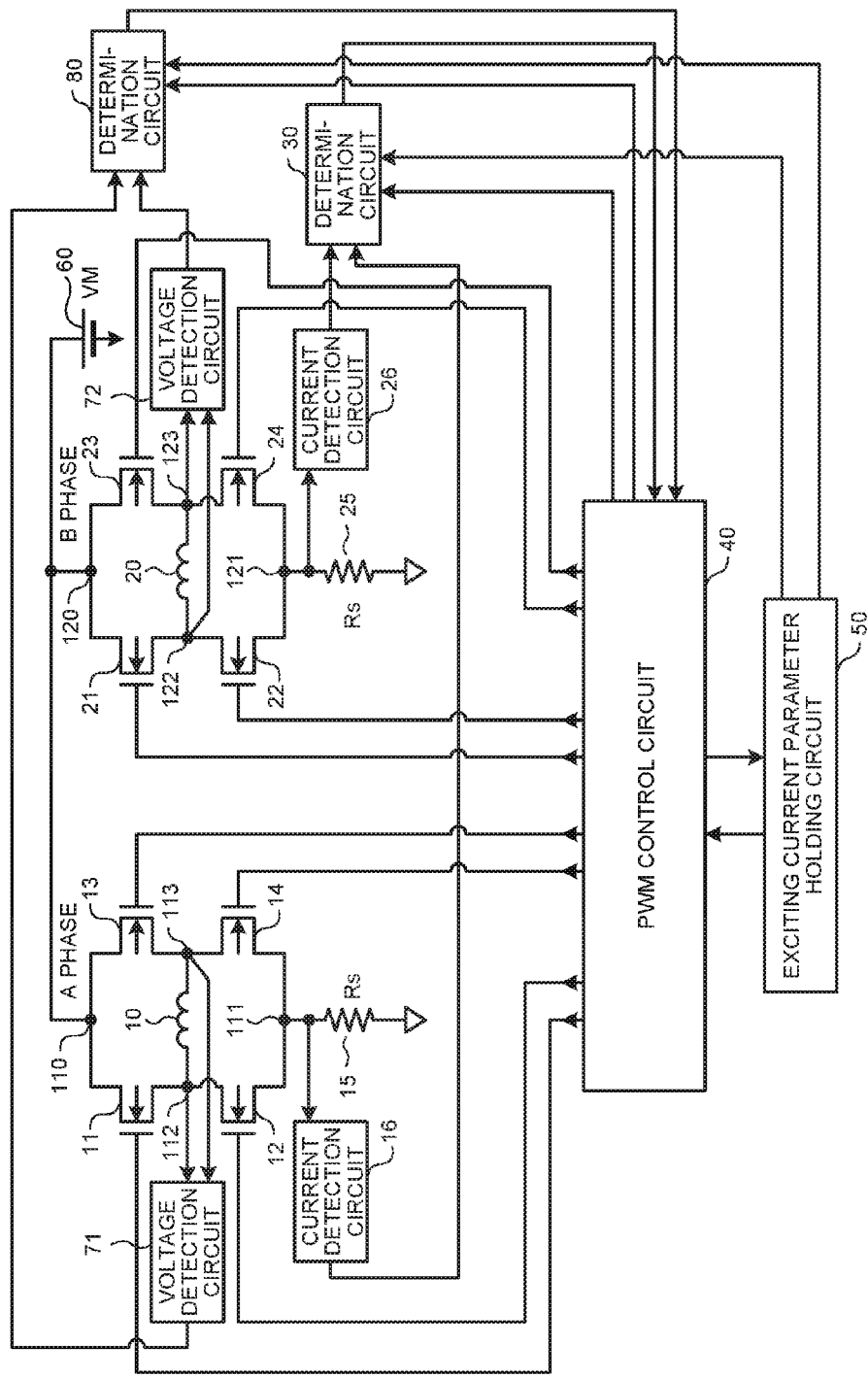
FIG. 11 is a diagram illustrating the configuration of a motor drive control device according to a second embodiment.

FIG. 11 is a diagram illustrating the configuration of a motor drive control device according to the second embodiment. Constituent elements corresponding to those of the already-described embodiment have the same reference numbers. The motor drive control device according to the present embodiment includes voltage detection circuits (71, 72) that detect voltages of the coils (10, 20). Output signals of the voltage detection circuits (71, 72) are supplied to a determination circuit 80.

The determination circuit 80 receives a signal from the PWM control circuit 40, and detects induced voltages at the coils (10, 20) at the time of Hi-Z described above, for example. The parameter value of an induced voltage is supplied from the exciting current parameter holding circuit 50 to the determination circuit 80. For example, at the time of Hi-Z, a parameter value indicating that an induced voltage is a zero voltage (0V) is supplied.

For example, when the induced voltage at the time of Hi-Z detected, the determination circuit 80 supplies an output signal for reducing the exciting current to the PWM control circuit 40. The PWM control circuit 40 corrects the parameter value so that the duty ratio of the PWM signals becomes small, for example, in response to the output signal of the determination circuit 80, and supplies the corrected parameter value to the exciting current parameter holding circuit 50. The exciting current parameter holding circuit 50 makes an exciting current pattern table with the corrected parameter value.

According to the present embodiment, an induced voltage at the time of Hi-Z can be detected, and the correction of an exciting current pattern can be performed in accordance with the detection result. Moreover, because the motor drive control device includes the current detection circuits (16, 26) that detect exciting currents and the determination circuit 30 that determines the detected currents, the control of the exciting current pattern based on the detection of the exciting current described above can be performed in parallel.

Figure 12:
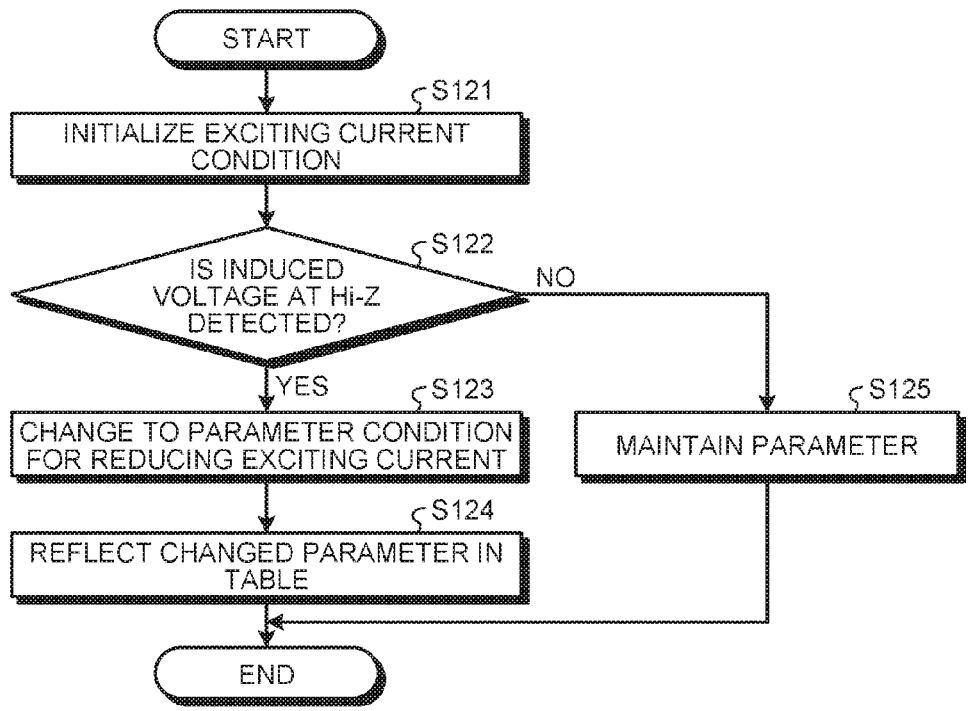
FIG. 12 is a diagram illustrating a flow of a motor drive control method that uses the embodiment illustrated in FIG. 11.

FIG. 12 is a diagram explaining a flow of a drive control method of a motor that uses the embodiment illustrated in FIG. 11. There is performed the initialization (S121) of an exciting current condition after setting a pseudo-sine-waveform exciting current pattern as an exciting current pattern, for example. The PWM control circuit 40 generates predetermined PWM signals on the basis of the initialized exciting current pattern, and supplies the PWM signals to the NMOS transistors (11 to 14, 21 to 24) that constitute the A-phase and B-phase H bridge circuits. The coils (10, 20) generate magnetic fields by using exciting currents from the NMOS transistors (11 to 14, 21 to 24) of the H bridge circuits. A rotor (not illustrated) is rotated in accordance with the generated magnetic fields.

An induced voltage is detected at a timing at which the exciting current becomes zero, namely, at the time of Hi-Z (S122). For example, the induced voltage of the B-phase coil 20 is detected at the timing P1 when the exciting current to the B phase is zero. When the induced voltage is detected (S122: Yes), the change to a parameter condition for reducing the B-phase exciting current is performed (S124). The changed parameter value is reflected in the exciting current pattern table held in the exciting current parameter holding circuit 50 (S124). When the induced voltage at the time of Hi-Z is not detected (S122: No), the parameter value of the originally set exciting current pattern is maintained (S125).

According to the flow of the present control method, the pattern of an exciting current can be changed in accordance with the presence or absence of the induced voltages occurring in the coils (10, 20) at the time of Hi-Z to generate an exciting current pattern corresponding to the characteristics of the respective motors. For example, by using a ground voltage as a predetermined voltage, determination control of whether the correction of the parameter value of the exciting current pattern is required can be performed in accordance with a comparison result with the ground voltage. Moreover, the control flow of the exciting current according to the detection result of the exciting current described above can be added to the control flow of FIG. 12.

Figure 13:
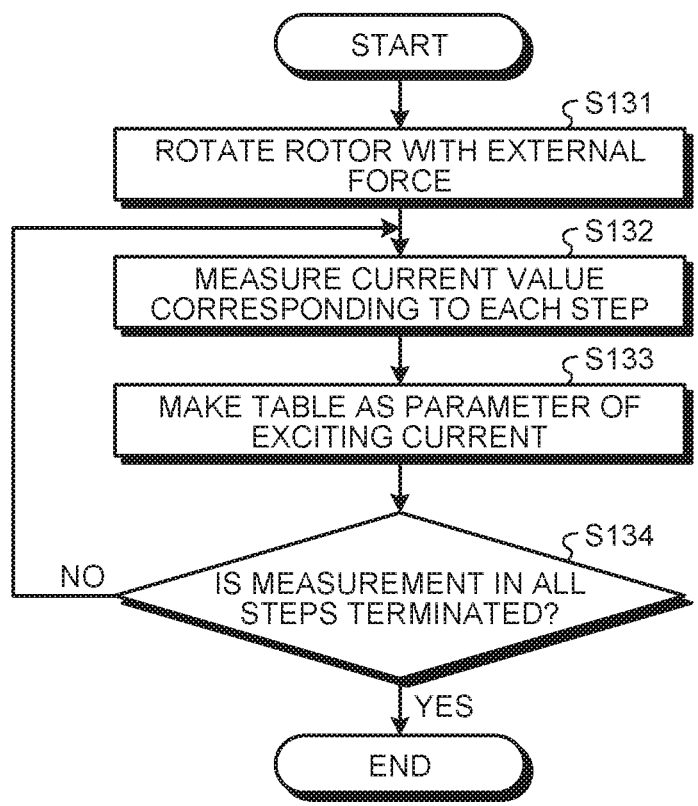
FIG. 13 is a diagram illustrating an example of another flow of the motor drive control method.

FIG. 13 is a diagram illustrating a flow of another example of the motor drive control method. In the flow illustrated in FIG. 13, the rotor of the motor is rotated by the external force in the state where an exciting current is not supplied (S131). In other words, the motor is activated as an electric generator.

A current value is measured at a timing corresponding to each step of micro-step drive (S132). For example, currents can be detected by converting induced voltages detected by the voltage detection circuits (71, 72) illustrated in the embodiment of FIG. 11 into the currents.

The value of the current detected at the timing corresponding to each step is extracted as a parameter, and a table is made as a parameter of an exciting current pattern (S133).

When the measurements of the current values in all steps are terminated (S134: Yes), the detection is terminated. When the measurements in all steps are riot terminated (S134: No), the detection is continued.

The value of a current obtained from the induced voltage can be held as an exciting current pattern in tabular form by activating the motor as an electric generator so as to use the current value as an inital value of the exciting current pattern. Various characteristics of the motor, for example, inductance and resistance of a coil, a rotating speed of a rotor, and the like are reflected in the induced voltage occurring in activating the motor as an electric generator. Therefore, in the state where the various characteristics of the motor are added, initial data of the exciting current pattern can be generated. The patternized parameter value is saved in, for example, the exciting current parameter holding circuit 50.

The already-described embodiments may have a configuration that NPN bipolar transistors are used in place of the NMOS transistors (11 to 14, 21 to 24) that constitute the H bridge circuits.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirt of the inventions.

What is claimed is:

1. A motor drive control device comprising:
   a first coil;
   a first H bridge circuit that supplies an exciting current to the first coil;
   a second coil;
   a second H bridge circuit that supplies an exciting current to the second coil;
   a PWM control circuit that supplies a PWM signal corresponding to a predetermined exciting current pattern to the first and second H bridge circuits;
   a first current detection circuit that detects a current flowing into the first coil;
   a second current detection circuit that detects a current flowing into the second coil;
   a holding circuit that holds a value of a parameter of the predetermined exciting current pattern; and
   a determination circuit that supplies a control signal for modifying the PWM signal supplied from the PWM control circuit to the PWM control circuit in accordance with the currents detected by the first and second current detection circuits, wherein the PWM control circuit modifies the value of the predetermined parameter of the predetermined exciting current pattern held in the holding circuit when the PWM signal is modified.

2. The motor drive control device according to claim 1, further comprising:

a first resistor that is connected to the first H bridge circuit and from which the current flowing into the first coil is supplied; and a second resistor that is connected to the second H bridge circuit and from which the current flowing into the second coil is supplied, wherein the first current detection circuit detects the current of the first resistor, and the second current detection circuit detects the current of the second resistor.

3. The motor drive control device according to claim 1, further comprising voltage detection circuits that detect voltages occurring in the first and second coils.

4. The motor drive control device according to claim 1, wherein the holding circuit holds a value of a parameter of a pseudo-sine-waveform exciting current pattern.

5. A motor drive control device comprising:

a PWM control circuit that generates a PWM signal corresponding to a predetermined exciting current pattern;

a holding circuit that holds a value of a parameter of the predetermined exciting current pattern;

an H bridge circuit that is constituted of switch transistors whose on/off is controlled by the PWM signal;

a coil to which an exciting current is supplied by the on/off of the switch transistors of the H bridge circuit;

a current detection circuit that detects a current flowing into the coil; and a determination circuit that compares a detection result of the current detection circuit with a value of a parameter of the predetermined exciting current pattern and outputs a signal for correcting the value of the parameter of the predetermined exciting current pattern held in the holding circuit in accordance with a comparison result.

6. The motor drive control device according to claim 5, further comprising a resistor that is connected to the H bridge circuit and to which a current flowing through the coil is supplied, wherein the current detection circuit detects a current flowing into the resistor.

7. The motor drive control device according to claim 5, further comprising a voltage detection circuit that detects a voltage occurring in the coil.

8. A motor drive control method for rotating a rotor by using magnetic fields caused by exciting currents flowing into a plurality of coils, the method comprising:

generating an exciting current according to an initial exciting current pattern;

supplying the exciting current according to the initial exciting current pattern to the coils to rotate the rotor;

comparing a value of a parameter of the initial exciting current pattern with a value of a parameter obtained by detecting a current flowing through the coils when the rotor is rotated, wherein the comparing includes comparing a set time until the exciting current according to the initial exciting current pattern arrives at a predetermined current value with a time until the current flowing through the coils arrives at the predetermined current value; and correcting the value of the parameter of the initial exciting current pattern in accordance with the comparison.

9. The motor drive control method according to claim 8, wherein the initial exciting current pattern has a pseudo sine waveform.

10. The motor drive control method according to claim 8, further comprising:

rotating the rotor in a state where the exciting current is not applied;

measuring the current flowing through the coils by rotation of the rotor; and generating the initial exciting current pattern based on a value of the measured current.

11. The motor drive control method according to claim 8, further comprising:

increasing the exciting current when a time until the current flowing through the coils arrives at the predetermined current value is longer than a set time until the exciting current according to the initial exciting current pattern arrives at the predetermined current value; and decreasing the exciting current when the time until the current flowing through the coils arrives at the predetermined current value is shorter than the set time until the exciting current according to the initial exciting current pattern arrives at the predetermined current value.

12. The motor drive control method according to claim 8, wherein the comparing includes comparing a value of the exciting current according to the initial exciting current pattern at a timing after a predetermined time passes from when the exciting current begins to be supplied to the coils with a value of the current flowing through the coils at the timing.

13. The motor drive control method according to claim 12, further comprising:

decreasing the exciting current when the value of the current flowing through the coils is larger than the value of the exciting current according to the initial exciting current pattern; and increasing the exciting current when the value of the current flowing through the coils is smaller than the value of the exciting current according to the initial exciting current pattern.

14. The motor drive control method according to claim 8, further comprising:

supplying a first-phase exciting current to a first coil of the plurality of coils; and supplies a second-phase exciting current different from the first-phase exciting current to a second coil of the plurality of coils, wherein the comparing includes at least a comparison in a case where a phase of at least one of the first-phase exciting current and the second-phase exciting current is an electrical angle of 45 degrees.

15. The motor drive control method according to claim 8, further comprising:

detecting, when an exciting current to be supplied to one of the plurality of coils is zero, a voltage occurring in the coil; and correcting the value of the parameter of the initial exciting current pattern in accordance with a detection result.

16. The motor drive control method according to claim 15, further comprising increasing the exciting current when a voltage exceeding a predetermined value is detected in the coil.

17. The motor drive control method according to claim 8, further comprising using a new exciting current pattern obtained by correcting the value of the parameter of the initial exciting current pattern as a next initial exciting current pattern.

* * * * *